United States Patent [19]

Berghof

[11] Patent Number: 4,593,952
[45] Date of Patent: Jun. 10, 1986

[54] ARTICULATED FITTING FOR VEHICLE SEATS

[75] Inventor: Hans-Joachim Berghof, Remscheid-Hasten, Fed. Rep. of Germany

[73] Assignee: Keiper Recaro GmbH & Co., Fed. Rep. of Germany

[21] Appl. No.: 562,204

[22] Filed: Dec. 16, 1983

[30] Foreign Application Priority Data

Dec. 24, 1982 [DE] Fed. Rep. of Germany ....... 3247947

[51] Int. Cl.$^4$ .......................... A47C 1/024; B60N 1/06
[52] U.S. Cl. .................... 297/365; 297/363; 297/367; 403/282; 403/365
[58] Field of Search ................. 297/363–366, 297/362, 367; 403/365, 282, 283

[56] References Cited

U.S. PATENT DOCUMENTS

| | | | |
|---|---|---|---|
| 3,102,746 | 9/1963 | Kerr | 403/283 |
| 3,365,220 | 1/1968 | Rusche | 403/365 X |
| 3,401,979 | 9/1968 | Putsch | 297/366 X |
| 3,479,088 | 11/1969 | Bonnaud | 297/366 X |
| 3,731,342 | 5/1973 | Cousin | 297/365 X |
| 4,076,309 | 2/1978 | Chekirder | 297/367 X |
| 4,082,352 | 4/1978 | Bales et al. | 297/364 |
| 4,165,128 | 8/1979 | Strowick et al. | 297/367 |
| 4,376,254 | 3/1983 | Hellmann | 403/365 X |
| 4,505,515 | 3/1985 | Wilking et al. | 297/362 |

Primary Examiner—William E. Lyddane
Assistant Examiner—Peter R. Brown
Attorney, Agent, or Firm—Wigman & Cohen

[57] ABSTRACT

In an articulated fitting for vehicle seats, two fitting elements are mounted on a bushing (4) which serves as a hinge pin allowing the fitting elements to be rotatable and pivotable relative to each other. In order to be able to rigidly connect an activating member (17) with one end of the bushing and a pin (19), which engages in the bushing, with the other end without danger of a misalignment, the two end surfaces (4', 4") of the bushing (4) are provided with axially projecting projections that penetrate into an annular shoulder (19) of the pin (18) and into the activating member (17), respectively. In addition, the end of the pin (18) that projects beyond the activating member (17) is formed as a rivet head (18") which holds the annular shoulder (19) and the activating member (17) in forced abutment against the bushing (4).

6 Claims, 5 Drawing Figures

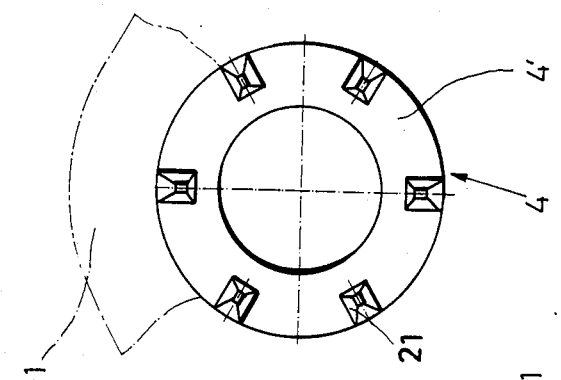
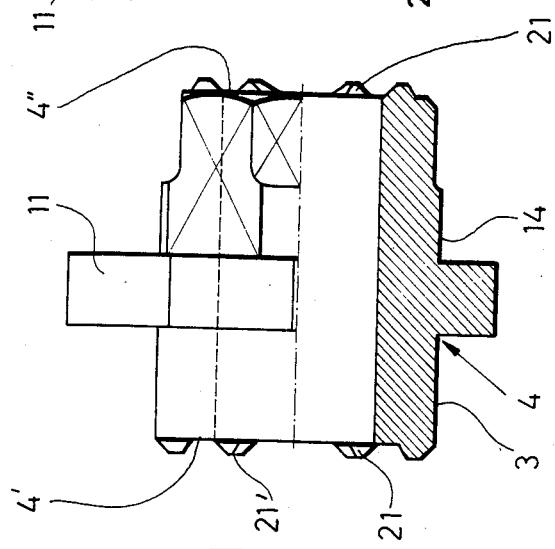
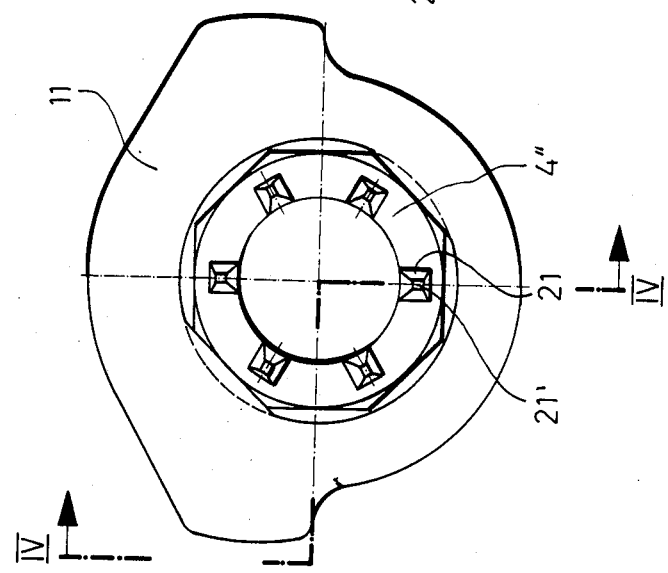

ARTICULATED FITTING FOR VEHICLE SEATS

BACKGROUND OF THE INVENTION

The invention relates to an articulated fitting for vehicle seats, particularly motor vehicle seats.

In the known articulated fittings of this kind, one end of a bushing is welded to a pin and the other end is welded to an activating member. The need to manufacture the bushing from a steel that is suitable for welding, as well as the welding itself, increases the manufacturing expense, because distortions can occur during welding which require a subsequent alignment.

SUMMARY AND OBJECTS OF THE PRESENT INVENTION

The object of the present invention is to improve an articulated fitting of the above-described type by making it more economical to manufacture.

According to the invention, the nonrotational connection of the pin and the activating member to the bushing requires only a single, economical step, namely the pressing of the pin and the activating member onto the respective end surfaces of the bushing, whereby the projections on the bushing are embedded in the annular shoulder of the pin and in the activating member. During this pressing, or subsequent thereto, the rivet head is formed by a gyrating rivet on the free end of the smaller diameter portion of the pin. With this pressing and riveting process, the elements cannot be pulled out of place, so that no subsequent alignment procedures are necessary.

Advantageously, the bushing is a sintered bushing. This reduces the manufacturing costs even further.

In a preferred exemplary embodiment the projections have the shape of truncated pyramids. Projections of this type are easy to form. In addition, this shape is favorable both with respect to the penetration into the material of the pressed elements and with respect to the transfer of torque.

To the extent that a certain positioning of the bushing relative to the pin must be maintained during assembly, as is usually the case, the pin can be provided with longitudinal grooves in an annular zone lying within the bore in the bushing. These grooves cooperate with the bushing and secure the pin against rotation relative to the bushing during assembly.

With the foregoing and other objects, advantages and features of the invention that will become hereinafter apparent, the nature of the invention may be more clearly understood by reference to the following detailed description of the invention, the appended claims and to the several views illustrated in the attached drawings.

BRIEF DESCRIPTION OF THE DRAWINGS

The invention is described in greater detail below with the aid of an exemplary embodiment illustrated in the drawings.

FIG. 3 is a top view of one end surface of the bushing;
FIG. 4 is a cross-section along line IV—IV of FIG. 3;
and
FIG. 5 is a partial view of the other end surface of the bushing.

DETAILED DESCRIPTION OF A PREFERRED EMBODIMENT

An articulated fitting to connect the frame of the back rest (not shown) of a vehicle seat with the seat frame (also not shown) includes an upper fitting element 1 to be connected with the frame of the back rest and a lower fitting element 2 to be connected with the seat frame. Both fitting elements are stamped elements of sheet steel and are formed such that a connection with the frame of the back rest and the seat frame is readily possible, even when both are made of tubular elements.

Figure 2:
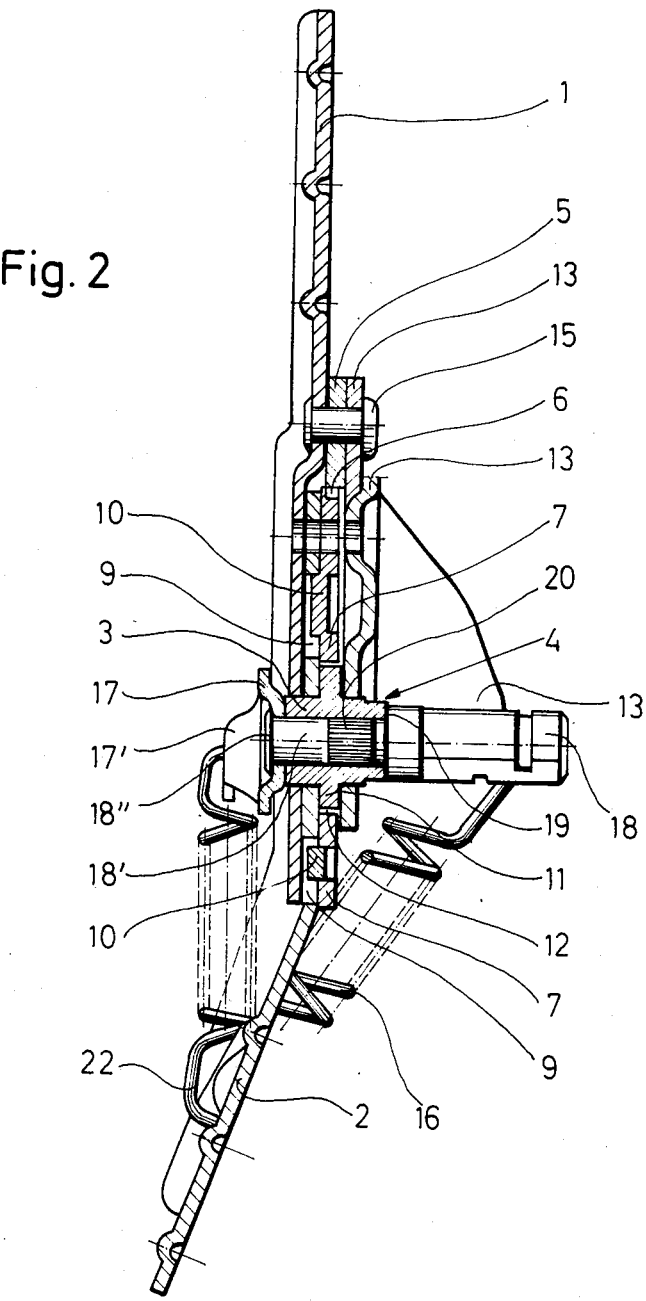
FIG. 2 is a cross-section along line II—II in FIG. 1.

As shown particularly in FIG. 2, the upper fitting element 1 and the lower fitting element 2 are rotatably mounted adjacent each other on a cylindrical end section 3 of a bushing 4 which forms the hinge pin and is itself a sintered bushing. The axial length of the end section 3 of the bushing 4 is only greater than the sum of the thicknesses of the upper fitting element and the lower fitting element in the area through which the bushing 4 passes by an amount that will assure that the necessary play is provided in the axial direction to allow a movement of the two fitting elements relative to each other.

In order to be able to lock the upper fitting element 1 in selectable positions with respect to the lower fitting element 2, a locking device is provided which has a toothed segment 5 connected to the upper fitting element 1 above the bushing 4, which includes teeth 6 running concentrically to the longitudinal axis of the bushing 4 on the edge thereof directed toward the bushing 4. Only a few of these teeth are illustrated. A slide 7, which is formed as a stamped element, cooperates with this toothed segment 5, which lies in the same plane as the toothed segment 5 and is provided with teeth 8 along its edge which faces said toothed segment which correspond to the teeth 6. Here, also, only a few of the teeth are illustrated.

The slide 7 can be moved in a translating manner on the lower fitting element 2 in the direction from the bushing 4 toward the toothed segment 5 and back. For this purpose, the lower fitting element 2 is provided with three rectangular guide windows 9 extending in the slide direction of the slide 7, in which guide bars 10 pressed out of the slide 7 engage like runners in a guide groove. Since the engagement of the guide bars 10 in the guide windows 9 is free of play in the pivot directions of the two fitting elements, the slide 7 is connected with the lower fitting element 2 so as to be nonrotatable relative thereto.

The movement of the slide 7 in its shifting direction takes place with the aid of a cam disc 11, which is formed in one piece with the bushing 4 and lies in a window 12 stamped out of the slide 7. During a movement of the slide 7 toward the toothed segment 5, and at times when the slide 7 is to be held in its locked position, where its teeth 8 engage the teeth 6, the cam disc 11 lies against the upper edge of the window 12 closest to the teeth 8. During a movement of the slide 7 into the release position, the cam disc 11 lies against the edge of the window 12 adjacent the lower end of the slide.

Because the cam disc 11 only prevents an axial movement of the bushing 4 relative to the two fitting elements and the slide 7 in one direction, a lock plate 13 is provided, which, like the fitting elements and the slide, is formed as a stamped element and is rotatably mounted on a cylindrical section 14 of the bushing 4 adjacent to the side of the cam disc 11 opposite the lower fitting element 2. The upper edge of this lock plate 13, which is stiffened by reinforcing creasing, covers the side of the toothed segment 5 opposite the upper fitting element 1 and is here rigidly connected with the upper fitting element 1 by means of two rivets 15, which also fix the toothed segment 5 to the upper fitting element 1. This lock plate 13 also holds the guide bars 10 of the slide 7 in engagement with the guide windows 9 and also forms a second mounting point for the upper fitting element 1. This triangular, laterally projecting section of the lock plate 13, which, as shown in FIG. 2, includes a backward bend, serves in the hooking of one end of the return spring 16, which is formed as a helical draw spring and has the purpose of pivoting the back rest forward when the lock is released. The other end of the return spring 16 is hooked in a stamped opening in the lower fitting element 2.

The rotational movement of the bushing 4 relative to the two fitting elements 1 and 2 that is necessary to open the locking device is effected by means of an activating member 17, which is also formed as a stamped element. To assure that the movement of this activating member 17 can also be transferred to the fitting provided on the other side of the seat, as shown in FIG. 2, a pin 18 is provided to simultaneously open and close the lock of said fitting. This pin 18 forms an annular shoulder 19 at the transition to a smaller diameter end section 18″. The end section 18′, the outside diameter of which is adapted to the bore diameter of the bushing 4, penetrates the bushing 4 and a cylindrical stamped-out opening in the activating member 17. An annular zone of the end section 18′ lying inside the bushing 4 is provided with longitudinal grooves 20, which are embedded in the bore wall of the bushing 4 as the end section 18′ is pushed in and thereby prevents a misalignment of the pin 18 relative to the bushing 4 during assembly.

The outside diameter of the pin 18 at the connection to the annular shoulder 19 is approximately equal to the outside diameter of the bushing 4 at the end directed toward the annular shoulder. In this manner the end surface 4′ of this end is at least mostly surrounded by the annular shoulder 19. The pin 18 is connected with the corresponding pin of the articulated fitting provided on the other side by means of a tube, which is pushed over the end section of the pin 18 which points to the right in FIG. 2 and is pressed together therewith.

As shown in FIGS. 3 through 5, the two end surfaces 4′ and 4″ of the bushing 4 are provided with truncated-pyramid-shaped projections 21 in order to be able to connect the activating member 17 with the bushing 4 and the bushing 4 with the pin 18 so as not to rotate relative to each other. These projections 21 are formed on the bushing 4 and project axially from the end surface that supports them. In the exemplary embodiment, six projections 21 are provided on each side and are distributed uniformly about its periphery. As FIGS. 3 and 5 show, the projections 21 are arranged along the outer edge of the end surface 4′ facing the activating member 17, on the side facing the annular shoulder 19 along the inner edge of the bushing. These illustrations also show that the projections 21 taper very rapidly, i.e., have a very small end surface 21′.

During assembly, the annular shoulder 19 and the center section of the activating member 17 arranged on the end section 18′ are pressed against the bushing 4 with sufficient force that the projections 21 are embedded in the annular shoulder 19 and the activating member 17, thereby producing a rotation-proof connection.

The end of the end section 18′ which projects beyond the activating member 17 is formed as a rivet head 18″ by riveting. Rivet head 18″ holds the bushing 4 in abutment with the annular shoulder 19 and holds the activating member 17 in abutment with the bushing 4.

Figure 1:
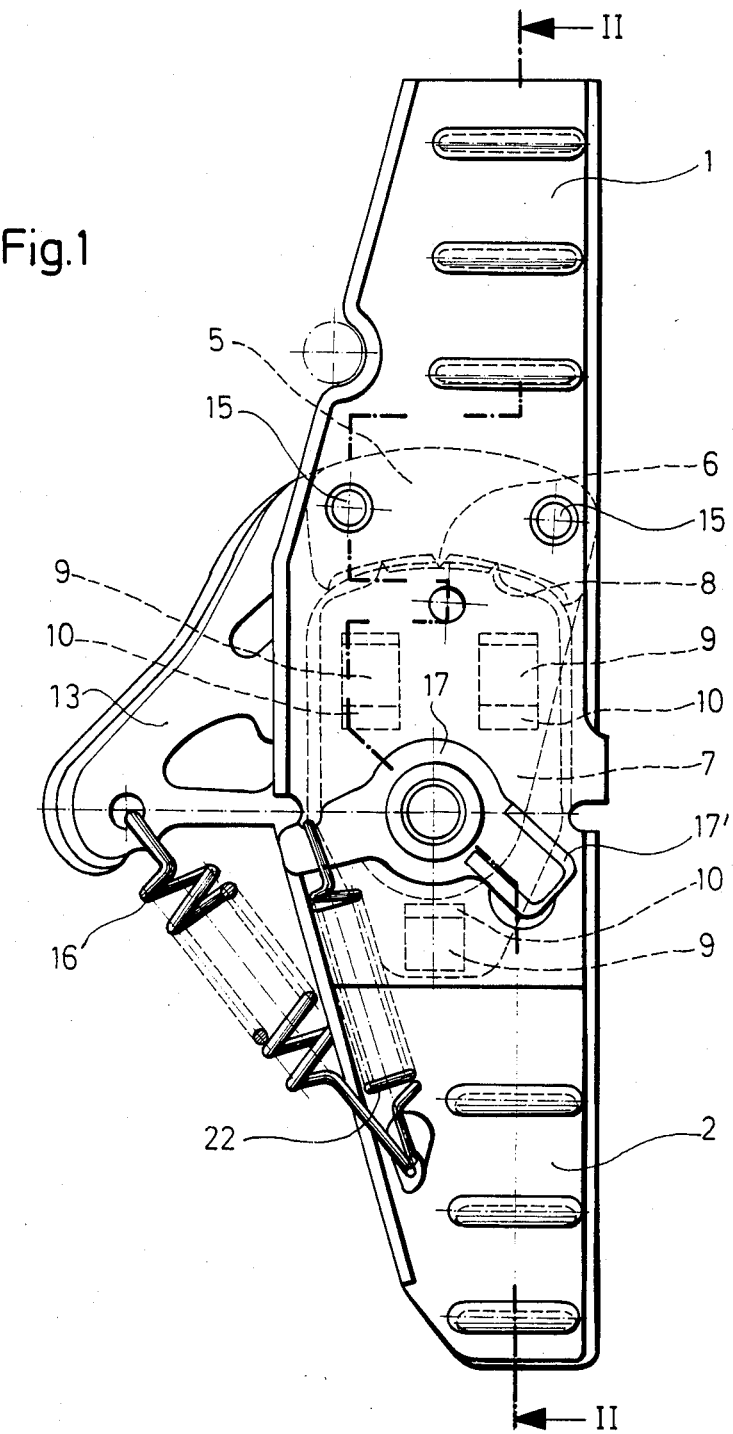
FIG. 1 is a side view of the exemplary embodiment.

One arm of the activating member 17 is formed as a hand grip 17′. A pre-biased helical spring 22 is connected to the other arm of the activating member 17, and is connected at its other end to the lower fitting element 2. The spring 22 exerts a torque on the activating member 17 which tends to hold the slide 7 in engagement with the toothed segment 5, i.e., tends to hold the lock in the closed condition. A manual activation of the activating member 17 against the force of the helical spring 22, i.e., a rotation of the activating member 17 in the clockwise direction as viewed in accordance with FIG. 1, causes the cam disc 11 to move the slide 7 away from the toothed segment 5. If the activating member 17 is then released, the helical draw spring 22 effects an automatic closing of the lock formed by the toothed segment 5 and the slide 7.

Although only preferred embodiments are specifically illustrated and described herein, it will be appreciated that many modifications and variations of the present invention are possible in light of the above teachings and within the purview of the appended claims without departing from the spirit and intended scope of the invention.

What I claim is:

1. An articulated fitting for vehicle seats, particularly motor vehicle seats, comprising:

a bushing having two end surfaces and a bore therein;

an upper and lower fitting element mounted on the bushing which serves as a hinge pin so that the fitting elements are rotatable and pivotable relative to each other:

a locking device form-fittingly fixing the upper fitting element in selectable pivot positions relative to the lower fitting element, comprising a locking member activated by rotation of the bushing relative to the fitting elements, an activating member nonrotationally connected to one end of the bushing, and a pin nonrotationally connected to the other end of the bushing, said pin having a larger diameter end section, a smaller diameter end section, and a transition section between said larger and smaller diameter end sections;

the transition section of the pin comprising an annular shoulder, said pin being disposed so that said annular shoulder is adjacent one end surface of the bushing and the smaller diameter end section of the pin is dimensioned so as to fit within the bore of the bushing;

the smaller diameter end section of the pin penetrating both the bore of the bushing and an opening in a section of the activating member abutting the other end surface of the bushing;

the bushing being provided on both end surfaces with axially projecting projections penetrating into the annular shoulder and the section of the activating member, respectively; and the end of the pin projecting beyond the activating member being formed as a rivet head which holds the annular shoulder and the activating member in forced abutment against the bushing.

2. The articulated fitting according to claim 1, wherein the bushing is a sintered bushing.

3. The articulated fitting according to claim 1, wherein the projections have the shape of pyramids.

4. The articulated fitting according to claim 3, wherein the bushing is a sintered bushing.

5. The articulated fitting according to claim 1, wherein the projections have the shape of truncated pyramids.

6. The articulated fitting according to claim 2, wherein the projections have the shape of truncated pyramids.

* * * * *